United States Patent
Toporek et al.

(10) Patent No.: US 7,359,395 B2
(45) Date of Patent: Apr. 15, 2008

(54) PRE-FETCH COMMUNICATION SYSTEMS AND METHODS

(75) Inventors: Jerome D. Toporek, Los Angeles, CA (US); Marc S. Dye, Camarillo, CA (US); Jeremy A. McCooey, Santa Monica, CA (US)

(73) Assignee: Packeteer, Inc., Cupertino, CA (US)

( * ) Notice: Subject to any disclaimer, the term of this patent is extended or adjusted under 35 U.S.C. 154(b) by 0 days.

(21) Appl. No.: 10/870,705

(22) Filed: Jun. 16, 2004

(65) Prior Publication Data

US 2004/0258053 A1 Dec. 23, 2004

Related U.S. Application Data

(60) Provisional application No. 60/479,028, filed on Jun. 16, 2003.

(51) Int. Cl.
*H04L 12/56* (2006.01)
(52) U.S. Cl. .................................. 370/401; 709/217
(58) Field of Classification Search ................ 370/230, 370/235, 401, 316, 466; 709/203, 217, 232
See application file for complete search history.

(56) References Cited

U.S. PATENT DOCUMENTS

| | | | | |
|---|---|---|---|---|
| 5,802,518 A | * | 9/1998 | Karaev et al. .................. 707/9 |
| 5,835,712 A | * | 11/1998 | DuFresne ..................... 709/203 |
| 6,003,087 A | * | 12/1999 | Housel et al. ............... 709/229 |
| 6,038,601 A | * | 3/2000 | Lambert et al. ............. 709/226 |
| 6,055,572 A | * | 4/2000 | Saksena ....................... 709/224 |
| 6,092,194 A | * | 7/2000 | Touboul ....................... 726/24 |
| 6,098,064 A | * | 8/2000 | Pirolli et al. .................... 707/2 |
| 6,182,072 B1 | * | 1/2001 | Leak et al. ..................... 707/10 |
| 6,230,168 B1 | * | 5/2001 | Unger et al. ............... 715/501.1 |

(Continued)

FOREIGN PATENT DOCUMENTS

WO    WP99/36869    *   7/1999

(Continued)

OTHER PUBLICATIONS

Performance enhancement for TCP/IP on a satellite channel; Stadler, J.S. Gelman, J., Lincoln Lab., MIT, Lexington, MA; This paper appears in: Military Communications Conference, 1998. MILCOM 98. Proceedings., IEEE Publication Date: 18-21 Meeting Date: Oct. 18, 1998-Oct. 21, 1998.*

(Continued)

*Primary Examiner*—Edan Orgad
*Assistant Examiner*—Salman Ahmed
(74) *Attorney, Agent, or Firm*—Mark J. Spolyar

(57) ABSTRACT

The present invention relates to telecommunications devices, systems and methods for providing improved performance over long latency communications links. Some embodiments selectively pre-fetch and transmit information over the link using improved protocol and pre-fetch mechanisms. One system includes a first gateway (430) adapted to communicate with a client (410), the first gateway including a processor coupled to a storage medium. The storage medium includes code for receiving a request for retrieving a web object, code for forwarding the request to a second gateway (440) over the long latency link, and code for receiving a pre-fetch announcement and response data for the web object from the second gateway. The pre-fetch announcement is received prior to receiving the response data.

13 Claims, 6 Drawing Sheets

U.S. PATENT DOCUMENTS

| | | | |
|---|---|---|---|
| 6,260,061 B1* | 7/2001 | Krishnan et al. | 709/213 |
| 6,415,329 B1* | 7/2002 | Gelman et al. | 709/245 |
| 6,442,651 B2* | 8/2002 | Crow et al. | 711/118 |
| 6,553,461 B1* | 4/2003 | Gupta et al. | 711/137 |
| 6,557,015 B1* | 4/2003 | Bates et al. | 715/501.1 |
| 6,766,422 B2* | 7/2004 | Beyda | 711/137 |
| 6,798,777 B1* | 9/2004 | Ferguson et al. | 370/392 |
| 6,907,429 B2* | 6/2005 | Carneal et al. | 707/10 |
| 6,947,973 B2* | 9/2005 | Shimura et al. | 709/217 |
| 6,959,318 B1* | 10/2005 | Tso | 709/203 |
| 2001/0051927 A1* | 12/2001 | London et al. | 705/51 |
| 2002/0055966 A1* | 5/2002 | Border et al. | 709/200 |
| 2002/0062384 A1* | 5/2002 | Tso | 709/229 |
| 2002/0116472 A1* | 8/2002 | Kalish et al. | 709/218 |
| 2002/0120710 A1* | 8/2002 | Chintalapati et al. | 709/216 |
| 2003/0061451 A1* | 3/2003 | Beyda | 711/137 |
| 2003/0069925 A1* | 4/2003 | Weaver et al. | 709/203 |
| 2004/0001476 A1* | 1/2004 | Islam et al. | 370/352 |
| 2004/0205149 A1* | 10/2004 | Dillon et al. | 709/217 |
| 2005/0080871 A1* | 4/2005 | Dinh et al. | 709/217 |
| 2005/0198309 A1* | 9/2005 | Li et al. | 709/227 |
| 2005/0210122 A1* | 9/2005 | Taylor et al. | 709/218 |
| 2006/0253546 A1* | 11/2006 | Chang et al. | 709/217 |

FOREIGN PATENT DOCUMENTS

| | | | |
|---|---|---|---|
| WO | WO99/53422 | * | 10/1999 |
| WO | WO00/46669 | * | 8/2000 |

OTHER PUBLICATIONS

Ulanoff; Power Browsing—Low-cost programs can help supercharge your Internet connection.(Software Review)(Evaluation) Windows Magazine, p. 171(1) Feb. 1, 1999.*

Cunha et al.; Determining WWW user's next access and its application to pre-fetching; Computers and Communications, 1997. Proceedings., Second IEEE Symposium on Jul. 1-3, 1997 pp. 6-11.*

Prasad; Intelligent Internet Caching and Prefetching; Jan. 2000.*

Padhye; Can Intelligent Prefetching Make Web Browsing Faster? Synthesis Project Report, Department of Computer Science, University of Massachusetts, 1997.*

* cited by examiner

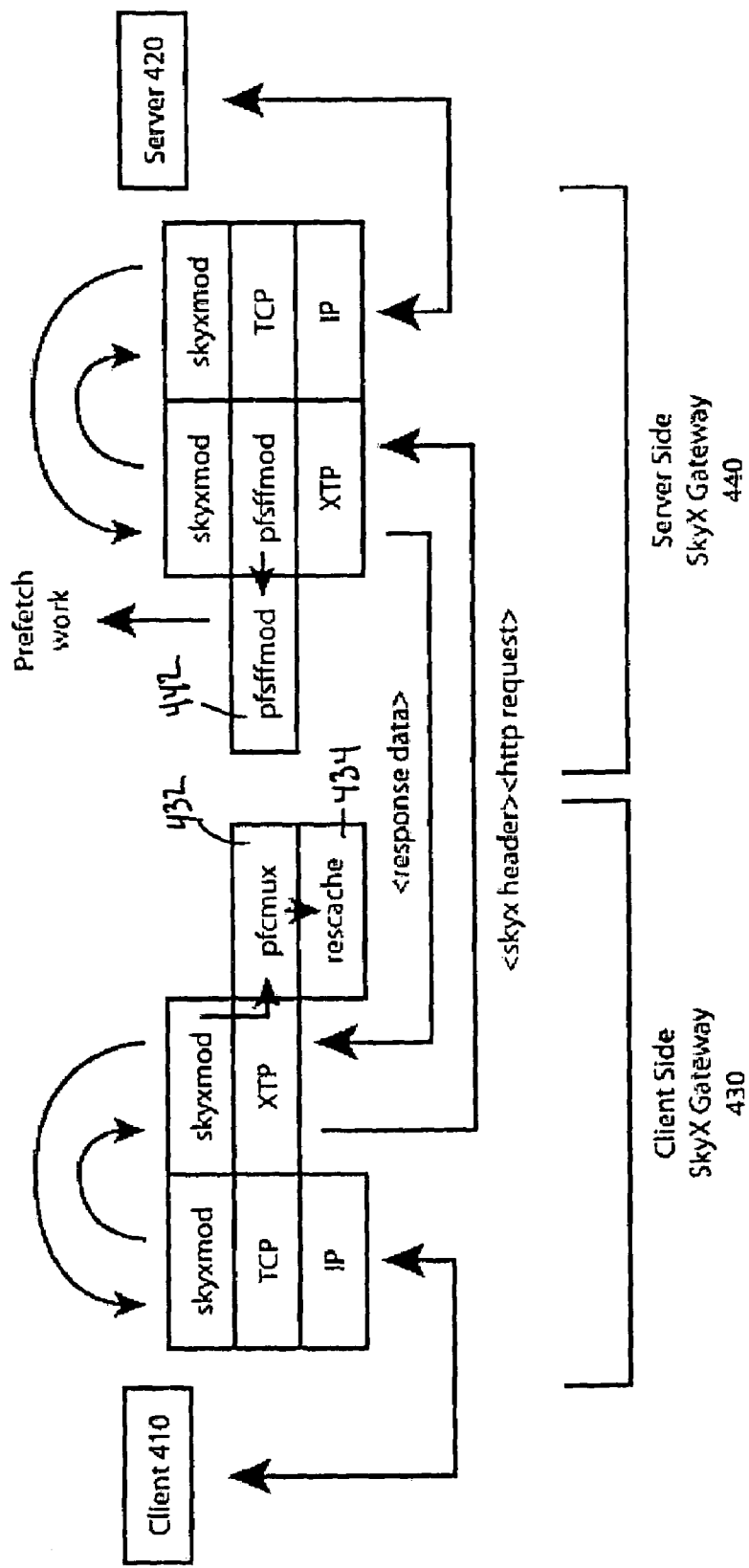
Figure 3A - Forward Fetch

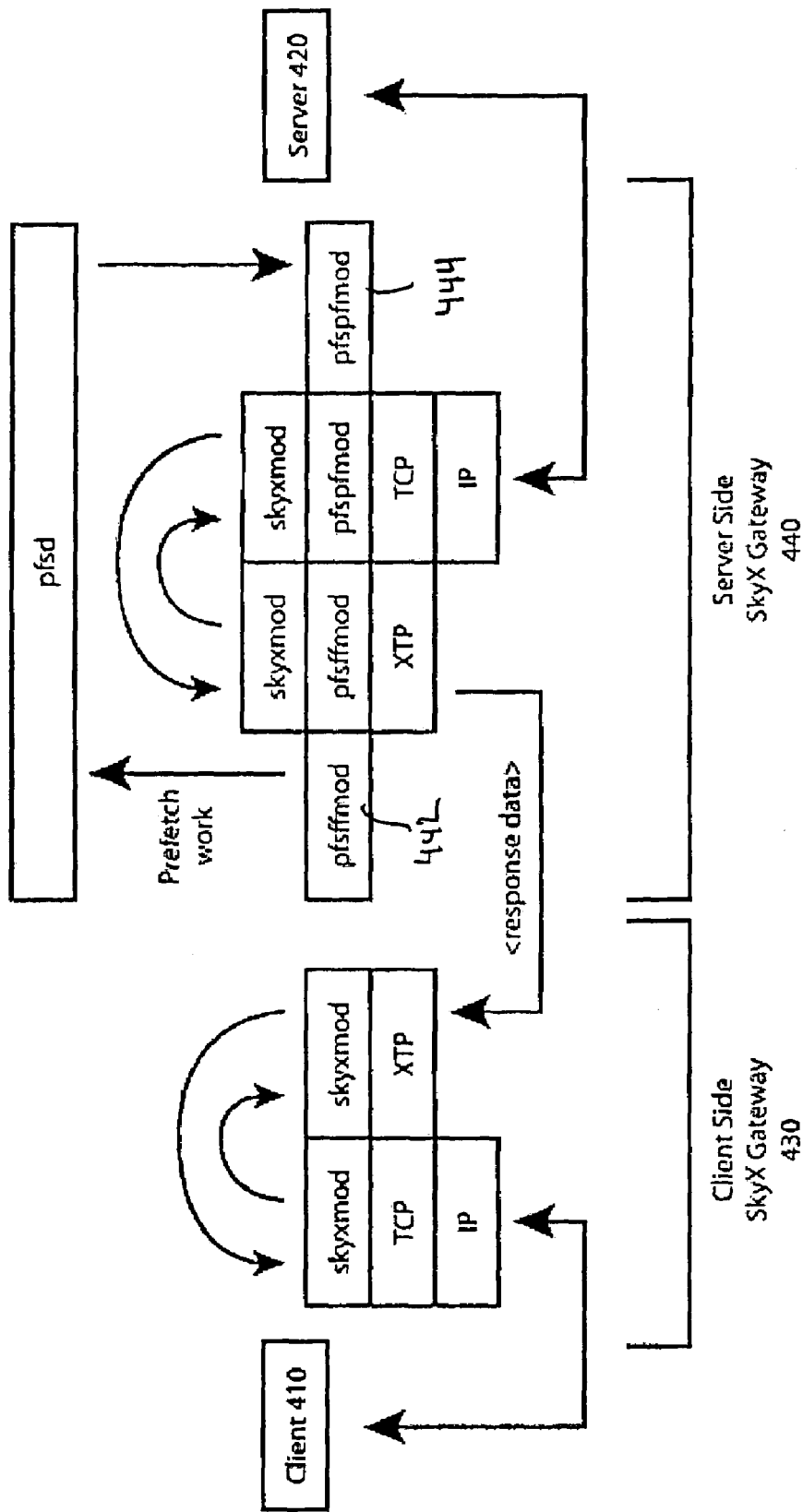
Figure 3B - Prefetch Connection

PRE-FETCH COMMUNICATION SYSTEMS AND METHODS

CROSS-REFERENCES TO RELATED APPLICATIONS

The subject application claims priority from U.S. Provisional Parent Application Ser. No. 60/479,028, filed Jun. 16, 2003, entitled 'Pre-Fetch Communication Systems and Methods.' The present application is a continuation-in-part of U.S. application Ser. No. 09/493,338, filed Jan. 28, 2000, entitled 'Internet Over Satellite Apparatus,' which claims priority from U.S. Provisional Patent Application No. 60/118,227, filed Feb. 2, 1999, entitled 'Internet Over Satellite Apparatus,' the complete disclosures of which are incorporated herein by reference for all purposes.

Related U.S. Pat. No. 6,460,085, filed May 6, 1999, entitled "Method and System for Managing Memory in an Internet Over Satellite Connection"; U.S. Pat. No. 6,529,477, filed Feb. 2, 1999, entitled "Internet Over Satellite System, "; U.S. Pat. No. 6,654,344, filed May 6, 1999, entitled "Method and System for Controlling Data Flow in an Internet Over Satellite Connection"; U.S. Pat. No. 6,584,083, filed Feb. 2, 1999, entitled "Internet Over Satellite Method"; U.S. application Ser. No. 09/999,777, filed Oct. 23, 2001, entitled "Multicast Delivery Systems and Methods"; and International Publication No. WO 00/46669 A1, entitled "Internet Over Satellite", each owned by the assignee of the present invention, also are incorporated herein by reference for all purposes.

BACKGROUND OF THE INVENTION

The present invention relates to telecommunications devices, systems and methods. More particularly, the present invention provides devices, systems and methods for pre-fetching and transmitting information over a satellite system, or other long latency system, for use in a wide area network of computers such as the Internet.

The Internet is an international "super-network" connecting together millions of individual computer networks and computers. The Internet is an extremely diffuse and complex system over which no single entity has complete authority or control. Although the Internet is widely known for presenting information through the World Wide Web (herein "Web"), there are many other services currently available based upon the general Internet protocols and infrastructure.

The Web is generally easy to use for people inexperienced with computers. Information on the Web can be presented on "pages" of graphics and text that contain "links" to other pages either within the same set of data files (i.e., Web site) or within data files located on other computer networks. Users often access information on the Web using a "browser" program such as one made by Netscape Communications Corporation of Mountain View, Calif. or Microsoft Corporation of Redmond, Wash. Browser programs process information from Web sites and display the information using graphics, text, video, sound, and animation. Accordingly, the Web has become a popular medium for advertising goods and services directly to consumers.

The Internet supports many other forms of communication. For example, the Internet allows one-to-one communication via electronic mail ("e-mail"). The Internet also has "bulletin boards," which are used by users to post colorful text and graphics for others to read and respond to, "chat rooms" for real time communication by way of typed messages, and the like. In some cases, the Internet can also be used for voice communication between users, audio and video broadcasts, multicasts, and the like. All of these forms of communication are possible, at least in part, by way of a connection which allows information to be transmitted from many different servers on the Internet.

The Internet is largely based on the TCP/IP protocol suite. At the network layer, an Internet Protocol (IP) provides a mechanism to deliver packets addressed to individual computers. The Internet has a plurality of computer systems implementing IP, which are generally interconnected to each other using local area networks (LANs) and dedicated transmission lines to form a wide area network (WAN) of computers. IP packets are delivered on a best effort basis and are not guaranteed to arrive at their intended destination, which is known as "unreliable" service.

For many applications that require reliable data delivery service, the Internet uses a connection mechanism called Transmission Control Protocol (TCP). TCP has a variety of desirable characteristics that allows it to be suitable for communication over the Internet. For example, TCP considers the data size or best sized segment of data to send from a transmitting server over the communication medium to a receiving server. Additionally, TCP maintains a timer, which waits for the receiving server to send an acknowledgement of the reception of the data segment from the transmitting server. If the timer times out before the acknowledgement is received, TCP resends the data segment, which provides reliability in the communication. TCP also maintains a checksum on its header and data, which monitors any modification in the data in transit. If the data arrives with an invalid checksum, TCP discards the data and does not acknowledge receiving the data. If data segments arrive out of order, TCP can also recombine the segments in order at the receiving server. Furthermore, TCP provides flow control, which only allows a finite amount of data to be sent to a buffer on the receiving server. This prevents a fast server computer from overflowing all the buffers on a slower server computer.

Although TCP has been well suited for transmitting Internet data between a plurality of servers, which are coupled to each other by way of conventional telephone systems and lines with similar characteristics, TCP has many limitations. For example, TCP is suitable for "short hops" but often slows down communication over extremely long distances which can have significant latency (e.g., transcontinental hops via satellite). Here, the flow control and acknowledgment features take too long to send and receive, which make communication slow. In particular, TCP has been found to be slow and cumbersome for transmission of Internet data over a satellite network. High speed transmission of Internet data over a satellite network, for example, to a relatively slower recipient, such as modem or the like, can cause congestion. Additionally, pathological conditions can arise in networking using satellites, that can cause resource exhaustion in systems, leading to further slowing of TCP connections. Networking using satellites often encounters significant bit error rates which leads to further slowing of TCP connections.

Still further, as internet users have become more sophisticated, web pages have become more content laden. The number of resources associated with some web pages has grown, and can number in the hundreds. Since each resource is retrieved individually, either over individual connections or sequentially over a single connection, long latency links add to the time and complexity in retrieving such web pages. Improvements are desired.

BRIEF SUMMARY OF THE INVENTION

The present invention relates to telecommunications devices, systems and methods. More particularly, the present invention provides devices, systems and methods for pre-fetching and transmitting information over a satellite system for use in a wide area network of computers such as the Internet. The present invention provides a high speed and quality transmission of signals to a distant location over a satellite system or other long latency system, including a private bridged network, terrestrial wireless network links, and the like. The transmission uses an improved protocol and pre-fetch mechanism, and also provides a controlled memory management in equipment for high speed and quality transmission of signals. In one embodiment an Xpress Transport Protocol (herein "XTP") is used.

Further, the pre-fetch functionality of the present invention improves the speed and efficiency of web page transfers. For example, the pre-fetch functionality enhances performance of HyperText Transfer Protocol (HTTP) transfers over a satellite link, or other long latency links, by pro-actively retrieving some or all of the many embedded objects on a web page along with the requested HyperText Markup Language (HTML) page. The present systems and methods deliver the web objects to the client side of the satellite link where they can be served locally when requested by the browser, avoiding the satellite delay.

In one embodiment of the present invention, a method of communicating over a long latency communications link includes receiving at a first gateway a request for retrieving a web object, forwarding the request to a second gateway over the long latency link, and receiving a pre-fetch announcement and a response data for the web object from the second gateway. The pre-fetch announcement is received prior to receiving the response data.

In some aspects, the pre-fetch announcement identifies at least one URI to be pre-fetched in anticipation of receiving a request for the URI. In other aspects, the pre-fetch announcement includes an address of the URI. In another aspect, the pre-fetch announcement includes a matching program which represents the request for retrieving the URI.

In one aspect, the method includes receiving the pre-fetched URI at the first gateway from the second gateway over the long latency link. The method may further include receiving a request to retrieve the URI, and comparing the request to the pre-fetched URI. The request to retrieve the web object and/or the URI also may be compared to a pre-fetch match list to determine if the web object and/or URI is being or has been pre-fetched. The pre-fetch match list is maintained on a memory coupled to the first gateway. The memory may be most any type of storage medium, and in one aspect is a resolver cache or the like.

In one aspect, the method further includes forwarding the request from the second gateway to the target server of the request, and receiving response data at the second gateway. The response data is parsed to identify at least one URI(s) to pre-fetch. The method includes forwarding a list of the URI(s) to be pre-fetched to the first gateway in the pre-fetch announcement. In one aspect, at least two pre-fetched URIs are forwarded to the first gateway from the second gateway over a same connection therebetween.

Another method of communicating over a long latency communications link according to the present invention includes receiving both a request for retrieving a web object and a pre-fetch limit indicator. The method includes retrieving the web object, parsing the web object to identify a plurality of resources to be pre-fetched, and sending a pre-fetch announcement and the web object over the long latency link. The pre-fetch announcement identifies at least some of the plurality of resources to be pre-fetched. The method includes sending at least some of the plurality of pre-fetched resources over the long latency link, wherein the pre-fetched resources are sent in compliance with the pre-fetch limit.

In alternative aspects, the pre-fetch limit indicator includes a limit on a pre-fetch connection rate between a client and a server, or a limit on a pre-fetch connection data amount. The pre-fetch limit indicator may be updated, with updates received over the long latency link in one aspect.

Another method of the present invention includes receiving, at a first gateway, a client request for retrieving a web object and forwarding the request to a second gateway over the long latency link. The method includes receiving a match program and response data for the web object from a second gateway. The match program represents a request for pre-fetching a URI. The method includes receiving a request for the URI from the client and interpreting the match program against the URI request. In one aspect, the match program is sent to the first gateway by the second gateway, and the first gateway interprets the match program against the request for the URI. In this manner, in one embodiment the logic of what to pre-fetch is maintained on the server side gateway. The logic can be updated or modified as needed or desired. In one embodiment, the client side gateway acts as an interpreter, to interpret whether the item being pre-fetched matches the actual request for that item from the client.

The present invention further provides apparatus and systems for communicating over a long latency communications link. In one embodiment, the system includes a first gateway adapted to communicate with a client, the first gateway including a processor coupled to a storage medium. The storage medium includes code for receiving a request for retrieving a web object, code for forwarding the request to a second gateway over the long latency link, and code for receiving a pre-fetch announcement and response data from the second gateway. In one aspect, the pre-fetch announcement is received prior to receiving the response data.

In one aspect, the system includes a second gateway adapted to communicate with a server and having a processor coupled to a storage medium. The storage medium includes code for receiving the request for retrieving the web object, code for retrieving the web object and parsing the web object for a URI to pre-fetch, code for creating and forwarding the pre-fetch announcement to the first gateway, and code for sending a request for retrieving the URI to a target server. In another aspect, the first gateway storage medium includes code for receiving a request for the URI from the client and comparing the request to the URI. This comparison may include, in one embodiment, interpreting a match program against the request for the URI. In this manner, only requested URIs can be selected to send to the client.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

FIGS. 3A and 3B are simplified diagrams of system architectures according to embodiments of the present invention.

DETAILED DESCRIPTION OF THE INVENTION

Figure 1:
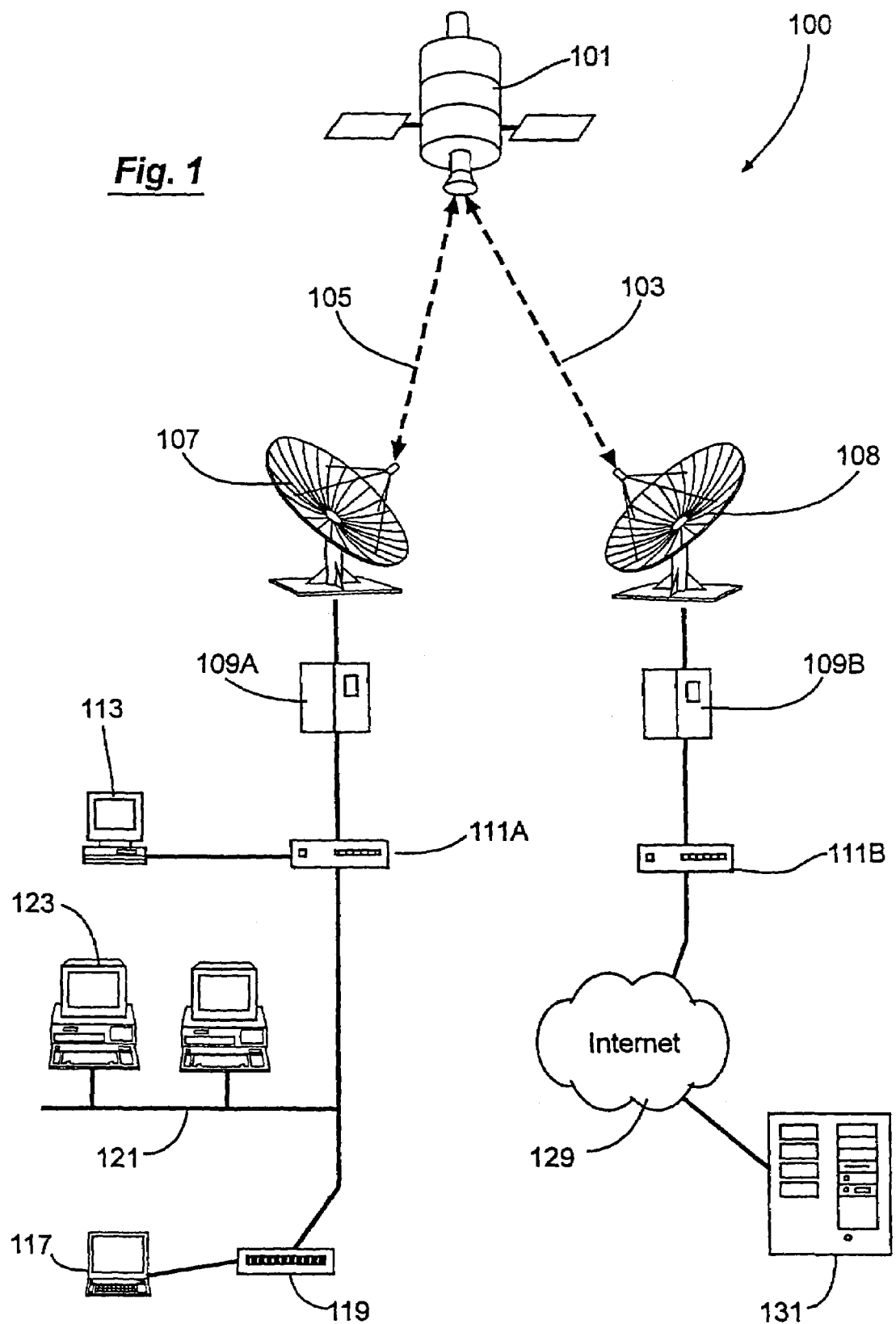
FIG. 1 is a simplified diagram of a satellite system according to an embodiment of the present invention.

FIG. 1 is a simplified diagram of a satellite system 100 according to an embodiment of the present invention. This diagram is merely an illustration and should not limit the scope of the claims herein. One of ordinary skill in the art would recognize other variations, modifications, and alternatives. Among other features, system 100 includes a satellite network system, which has one or more satellite(s) 101. Satellite 101 receives and transmits information between a plurality of ground stations 107, 108 or satellite dishes. Each satellite ground station includes a satellite dish or antenna, and a satellite modem 109A, 109B or other form of receiver such as a VSAT indoor unit, which is coupled, directly or indirectly to a satellite gateway 111A, 111B.

Satellite antenna 108 receives and transmits signals 103 through satellite 101. Satellite antenna 108 connects to satellite gateway 111B, which in one embodiment occurs through satellite modem 109B. Satellite gateway 111B is coupled to a network 129 such as a WAN, the Internet 129 or the like. One or more servers 131 are coupled to the network 129. The server and the Internet communication occur in a common protocol such as TCP/IP, UDP/IP or the like.

Satellite antenna 107 receives and transmits signals 105 through satellite 101. Satellite antenna 107 connects to satellite gateway 111A, which in one embodiment occurs through satellite modem 109A. Satellite gateway 111A is coupled to a LAN 121 such as Ethernet, Token Ring, FDDI, or the like. LAN 121 operates to couple gateway 111A to one or more computer terminals 123 or clients. Here, satellite gateway 111A couples to a laptop 117 through a modem 119. Gateway 111A also may couple directly to a computer or client 113. The client, laptop, and LAN use a common connection format such as TCP/IP, IPX/SPX, or the like. Satellite gateways 111A and 111B will be described in more detail below.

In a specific embodiment, satellite gateway 111A intercepts a TCP connection attempt from a client 123, 117 or 113 intended for server 131. Gateway 111A establishes a separate connection to satellite gateway 111B via satellite 101. Data received at gateway 111A is transmitted to satellite gateway 111B over this separate connection using a protocol better suited for long latency links. In one embodiment, a satellite protocol is used, and in a particular embodiment, an XTP protocol is used. Satellite gateway 111B on the opposite side of the satellite link receives the data, and sends the data to server 131 using the TCP/IP protocol or other suitable protocol. In a specific embodiment, the present invention provides improved performance over conventional techniques. Additionally, techniques of the present invention remain substantially transparent to an end user and are fully compatible with the Internet or an internet infrastructure. In many, if not all aspects, no substantial changes are required to the client or server. In preferred embodiments, applications continue to function without substantial hardware and/or software modifications. Additional details on communications through system 100 are found in International Publication No. WO 00/46669 A1, entitled "Internet Over Satellite," and the U.S. Applications and patents previously incorporated herein by reference.

Although the above has been described in terms of a specific networking diagram, it is possible to implement the present satellite gateway in other configurations. For example, the present satellite gateway can be one "hub" or central gateway that serves a plurality of remote gateways. Each of the remote gateways is connected to the central gateway to create an individual satellite link.

Other common network topologies can also be used. Further, in some embodiments, different telecommunications links can be used to carry forward and backward paths of a connection. For example, a satellite link can be used to carry data on the forward path from the Internet to the remote site, while telephone line can be used for the backward path from the remote site to the Internet. Other types of telecommunications hardware may be substituted for the example hardware described here without departing from the scope of the present invention.

Additionally, while satellite gateway 111A is generally described as a stand alone unit, in another embodiment the functionality of gateway 111A is incorporated into client 113, 117 and/or 123, or any other client machine. For example, the present gateway can be implemented on a personal computer using a satellite card or standalone satellite modem which can be inserted into a Windows™ XP machine. The present gateway can also be implemented on other operating systems such as Windows NT, Windows 98, Windows Me, MacOS, Linux, HP-UX 11, VxWorks, UnixWare, and the like. Of course, the exact manner of implementation will depend upon the application. Additionally, the present satellite gateway may be integrated into a standalone satellite modem, VSAT hardware, router or other network devices.

Figure 2:
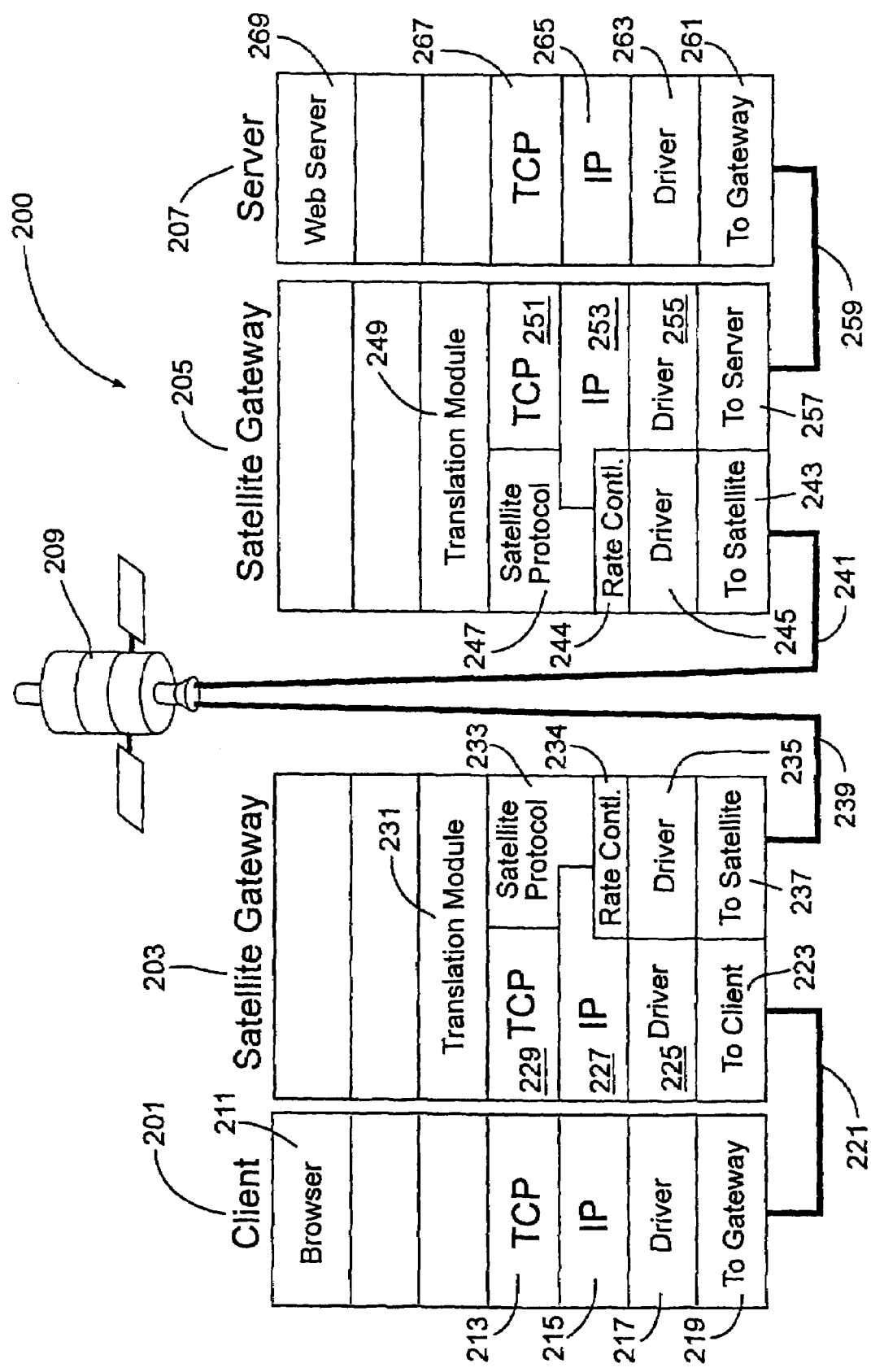
FIGS. 2 and 2A are simplified diagrams of system architectures according to embodiments of the present invention.

FIG. 2 is a simplified diagram of system architecture 200 according to an embodiment of the present invention. This diagram is merely an illustration and should not limit the scope of the claims herein. One of ordinary skill in the art would recognize other variations, modifications, and alternatives. The system architecture 200 includes at least a client 201, which is coupled to a satellite gateway 203, which transmits and receives information via satellite link 209 from a satellite gateway 205. Satellite gateway 205 couples to a server 207. Satellite gateway 205 and server 207 couple to each other through the Internet or an internet-like network of computers. In one embodiment, gateways 203 and 205 are SkyX Gateway XH45 or SkyX Gateway XR10 both commercially available from Mentat Inc. of Los Angeles, Calif. In another embodiment, one or both gateways 203, 205 are SkyX Gateway XH155, also commercially available from Mentat Inc.

Client 201 can be represented in multiple layers, including application and physical layers. The layers may include a browser 211. The browser 211 allows a user to communicate information from an application layer to a physical layer for transmission to a gateway. The browser 211 is generally in the application layer, which provides the information. For example, the browser can be one of suitable design made by Netscape Communications Corporation of Mountain View, Calif., or Microsoft Corporation of Redmond, Wash., or others. In addition to browsers, other TCP applications, including FTP file transfers, may also be used to communicate between clients and servers.

The information goes through a transport layer (e.g., TCP) 213 and then through an IP layer 215, which is the networking layer. The transport layer provides a flow of data between the client and the gateway. The IP layer handles movement of data comprising packets between the client and the gateway, or other network. The information is sent through the physical layer, which includes a driver 217. Driver 217 transmits the information to gateway 203 through hardware 219 connected to gateway 203 via a telecommunications link 221, which can be a wire, cable, fiber optic, or other physical or wireless communication medium. Alternatively, driver 217 receives information from gateway 203 via link 221 and hardware 219.

From connection 221, the information traverses to gateway 203. Gateway 203 has a physical layer 223, which interacts with a driver 225. The gateway also includes a networking layer 227 and a transport layer 229, which is coupled to a translation module 231. Networking layer 227 determines whether the information can be routed over the satellite protocol. If so, the data is passed up to transport layer 229. If not, the data is immediately forwarded out to a rate control module 234 for delivery to a satellite link 239 in non-translated form. Translation module 231 converts the information into a satellite protocol 233, which is suitable for use over a satellite link. Rate control module 234 determines whether the information can be passed immediately to the satellite connection or be queued for later delivery. The satellite connection is coupled to a physical layer 237 by a driver 235, which transmits information to and from satellite 209. The information traverses to and from satellite 209 in a wireless medium, 239, 241. In one embodiment, the protocol "conversion" or "translation" occurs when gateway 203 receives packets of data in one protocol, such as TCP/IP, removes the data from the received packets, buffers the data, and repackets the data into packets having a second protocol, such as XTP. The repacketed data is sent over wireless medium 239 for receipt by gateway 205.

Information is received by satellite gateway 205, which includes multiple layers, physical and others. A physical layer 243 couples to a driver 245. The networking and transport layer include a satellite protocol 247 and a rate control 244. The network and transport layers connect to a session layer which comprises a translation module 249. Translation module 249 converts the information using the satellite protocol back to TCP/IP. The information traverses through a transport layer (i.e., TCP) 251 and a networking layer (i.e., IP) 253. Information from satellite gateway 205 enters a physical layer 257 through a driver 255. Driver 255 transmits the information to a server 207 over telecommunications link 259. Driver 255 can also receive information from server 207 in the reverse path.

From telecommunications link 259, the information is sent to a driver 263 in server 207 via a physical layer 261. The information traverses from driver 263 to a networking layer, which includes IP 265. The information also traverses from the networking layer to a transport layer, which includes TCP 267. The information is delivered to a Web server application 269, for example. Between server 207 and satellite gateway 205 is the Internet or another IP network, depending upon the application.

In a specific embodiment, information can flow through a gateway, such as gateway 203, 205 at the network layer, bypassing the transport and application layers altogether. For example, in gateway 203, information can enter from client 201 via telecommunications link 221. Physical layer 223 passes the information to driver 225. In turn, driver 225 passes the information to network layer 227. Network layer 227 can route the information to its destination using IP. The information then flows from network layer 227 to rate control module 234 to driver 235. Driver 235 interacts with physical layer 237 to pass the information along to satellite 209 via telecommunications link 239. Information routed at the network layer is generally user datagram protocol (UDP) or other non-TCP packets that are not suitable for protocol translation at the transport layer.

In a specific embodiment, the translation module converts information using a TCP connection to a suitable connection for transmission over a satellite system. This process involves, in one embodiment, the buffering of data received in the TCP/IP packets, and repacketing of data into a second protocol more suitable for long latency links. The data contained in a packet of the second protocol may be made up of data received in one or more TCP/IP packet, or a portion of data received in one TCP/IP packet. The suitable connection for the satellite is generally resilient to transmission over a wireless network such as a satellite network, e.g., Orion Worldcast™ or PanAmSat™ SpotBytes™ services, and the like. The connection should also be suitable for long latency, high loss, and asymmetric bandwidth conditions. The long latency is typically about 200 milliseconds to about 700 milliseconds, per satellite hop but is not limited to such values.

Figure 2A:
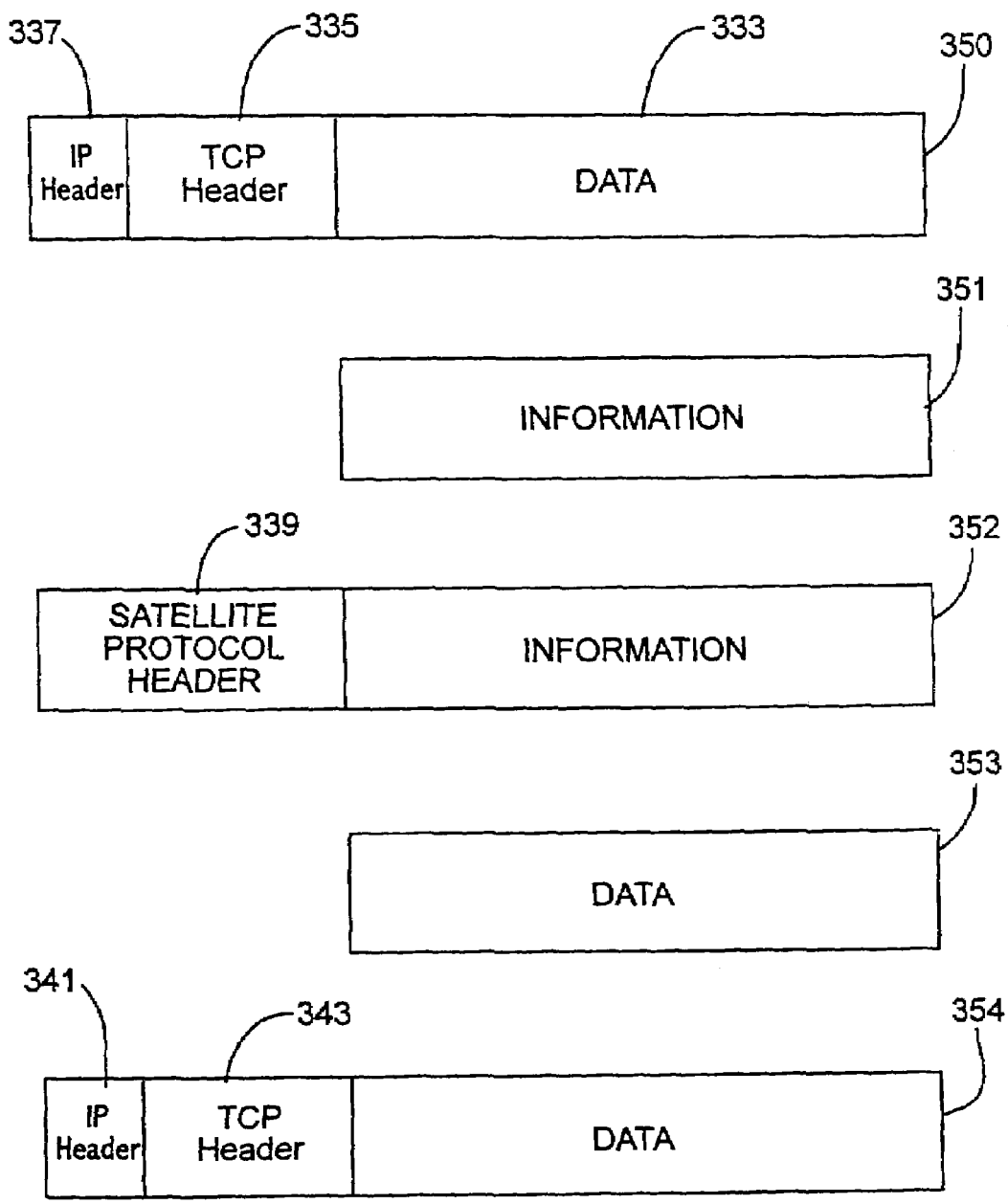

In a specific embodiment, the present translation module converts information using a TCP connection into a modified TCP, a Space Communications Protocol Standard (SCPS), an XTP, or an XTP-like protocol for transmission over a satellite link. As illustrated by FIG. 2A, for example, the TCP module receives information 350 including the TCP connection. The information includes data 333, a TCP header 335, and an IP header 337. The TCP module removes TCP header 335 from the information such that the information 351 includes substantially all data 333 and passes the data, along with certain TCP header information, to the translation module. The translation module passes the data or portions of data to the satellite protocol module where a satellite protocol header 339 is prepended onto the data. The header is an XTP header or the like. The information 352 now includes the XTP header, which is suitable for transmission over the satellite link. Depending on the specific implementation, the XTP header and data may also be prepended with an IP header for transmission over the satellite link. Further, the amount of size of data contained in one packet may vary from the amount or size of data received in the TCP/IP packet at the gateway. In particular, the information is transferred to the physical layer and the driver. The driver and physical layer send the information to a receiving satellite gateway, which may prepend additional headers.

From the satellite link, the information including the XTP header enters a receiving XTP module. The receiving XTP or satellite protocol module removes the XTP header from the information, leaving data 353. The receiving satellite protocol module passes the data to the translation module, which can be a routing module used to route data to the proper protocol. The translation module then passes the data to the TCP module. The receiving TCP module attaches a TCP header 343 and IP header 341 onto the data to form information that is now ready for transmission over a network to a receiving server destination. Again, in one embodiment the amount or size of the data contained in each packet may vary from the amount or size of the packet sent over the satellite link. The information using the TCP connection traverses through a network to the destination server.

In other embodiments, the translation module can also convert a portion of the information including the data and TCP/IP headers to information using the XTP protocol. Alternatively, the translation module can convert more than one segment of information including multiple TCP/IP headers into a single piece of information including the XTP header for transmission over a satellite link. Depending upon the application, the translation module can convert the information including the TCP connection into any one or any combination of the above. Further details of these and other techniques are provided in International Publication No. WO 00/46669 A1, entitled "Internet Over Satellite," the complete disclosure of which has been previously incorporated herein by reference.

As noted, the number of resources associated with some web pages has grown considerably. These resources can include, but are not limited to, pictures and other images, charts and graphs, video segments, animation, advertisements, links to other web pages or related pages, and the like. Since each resource is retrieved individually, either over individual connections or sequentially over a single connection, long latency links such as a satellite link can add to the time and complexity in retrieving such web pages. The inventors of the present invention have developed devices, systems and methods for pre-fetching resources associated with a particular web page, in part to improve web page transfer speed and efficiency.

An embodiment of apparatus, systems and methods of communication, including the pre-fetching of resources, according to the present invention will now be described in conjunction with FIGS. 3A and 3B. As shown in FIGS. 3A-3B, a client side gateway 430 and a server side gateway 440 include, in one embodiment, similar modules and functionality as do gateways 203 and 205. For example gateways 430, 440 include IP, TCP and XTP modules. Gateways 430 and 440 include a translation module labeled skyxmod in FIGS. 3A-3B.

In one particular embodiment, gateways 430 and 440 include additional modules as needed to implement the described functionality. For example, in one embodiment client side gateway 430 includes a module 432 labeled "pfcmux" in FIGS. 3A and 3B, and a resolver cache (res-cache) 434. Module 432 may include, in one embodiment, a pre-fetch object database keyed by a URI and/or by a serial identifier assigned by server side gateway 440. The database entries may include the keying information, the request match program, the response match program, and identifiers for a TCP connection, an XTP connection, or the like. In one embodiment, server side gateway 440 includes a module 442 labeled "pfsffmod" and a module 444 labeled "pfspfmod", which operate to implement some or all of the functionality described herein. For example, module 442 includes, in one embodiment, a pre-fetch client database, and may include connection metering and resource management information. Module 444 may contain, in one embodiment, data structure components including per connection instance data structure. Those skilled in the art will recognize that the present invention is not limited to the particular modules disclosed herein, and that other modules and implementations also may be used within the scope of the present invention.

A client side gateway 430 listens for hypertext transfer protocol (HTTP) connections on one or more HTTP ports (currently port 80 or port 8080). When a connection request is received from a client 410, it will be received on the HTTP port in the form of a TCP SYN packet. Client side gateway 430 completes the TCP connection with client 410 by sending a SYN ACK to the client. The SYN ACK packet sent to client 410 has a source address of a server 420 that was the subject of the HTTP request, and not client side gateway 430. In this manner, client 410 is unaware that the TCP connection request to the target server 420 is being intercepted by a gateway 430. Once the TCP connection is made between client 410 and client side gateway 430, client side gateway 430 collects the HTTP request information over the TCP connection from client 410. For example, this may involve gateway 430 receiving an HTTP request from client 410 to download or "GET" a web page, such as the Cable News Network home web page <www.CNN.com> from server 420.

Once the complete HTTP GET request is received at client side gateway 430, client side gateway 430 attempts to match the request with a pre-fetch match list, or database. This match list/database is maintained on or in conjunction with client side gateway 430, and is periodically updated as discussed further below. Gateway 430 determines if the HTTP request has already been pre-fetched or is being pre-fetched, or if this is a new HTTP request. For example, if the user is requesting the website <www.CNN.com> for a first time, this may involve a new HTTP request (FIG. 3A). Correspondingly, if client 410 has received the <www.CNN.com> web page and the client browser is attempting to download resources (e.g., image files, advertisements, links, or the like) on that page, then some or all of the HTTP requests may have been pre-fetched as further described below (FIG. 3B).

For new HTTP requests, in one embodiment client side gateway 430 initiates a new XTP connection to a server side gateway 440. The HTTP request is sent to server side gateway 440 starting in the XTP connection request packet. While this procedure breaks the end-to-end semantics that are otherwise maintained in FIGS. 2 and 2A, the method does eliminate a round-trip from the connection set-up procedure. In this manner, the time to download a web page, and the plurality of references associated therewith, can be reduced. In one embodiment, the XTP connection is established between gateways 430 and 440 over a satellite link or other long latency link similar to that depicted in FIGS. 1 and 2. Further, the XTP connection request packet, and other "packets" sent from gateway 430 may have undergone the protocol conversion or translation, including the buffering and repacketing of data, as discussed in conjunction with FIGS. 1 and 2.

Server side gateway 440 will receive the XTP connection request on a port listening for pre-fetch requests, and will forward the HTTP request to target server 420 on a TCP connection using, in one embodiment, the protocol conversion as previously discussed. The HTTP request will, in one embodiment, appear to the target server 420 to have originated from client 410 and target server will be unaware of gateways 430 and 440. This is generally referred to as "forward fetch" herein (see FIG. 3A). In the example discussed, target server 420 will be the server maintaining the <www.CNN.com> webpage, but can be other servers, including web proxy servers, within the scope of the present invention. Server 420 responds to the HTTP request, and sends the requested HTML file to client 410 via the established TCP and XTP connections. Server side gateway 440 will read the HTTP response data received from target server 420 and intended for client 410 to find items or resources to pre-fetch. Each resource on the <www.CNN.com> webpage will have a corresponding universal resource identifier (URI). For each URI that is identified for pre-fetching, server side gateway 440 will send a pre-fetch announcement encoded in the XTP connection back to client side gateway

430. In one embodiment, the pre-fetch announcement comprises a prefetch header sent to gateway 430 with the response data.

Once the pre-fetch announcement(s) arrive at client side gateway 430, the information in each announcement is used to create a corresponding match list/database entry. Each database entry contains a request match header and an identifier created by server side gateway 440 that are included in the pre-fetch announcement. Other information may also be present in the entry, including a response match header arriving on the XTP pre-fetch connection. The request match header is used to match HTTP requests from the browser on client 410. The identifier is used to pair pre-fetch XTP connections from server side gateway 440 with their corresponding pre-fetch announcements in the match list/database. In one embodiment, a timer is initiated for each database entry, with an initial timeout of about twenty (20) seconds. When the corresponding TCP connection from client 410 arrives requesting a resource that has been or is being pre-fetched, in one embodiment the timer is reset to about three (3) seconds. If the timer expires before the corresponding client TCP connection and the XTP connection delivering the pre-fetched resource arrive, then the database entry is deleted. It will be appreciated by those skilled in the art that the timer settings may vary depending on the application and/or desired system performance within the scope of the present invention.

Server side gateway 440 initiates TCP connections to target server or servers 420 to retrieve the resources designated for pre-fetch. In one embodiment, for each pre-fetch URI, server side gateway 440 will initiate a new XTP connection back to client side gateway 430 to transfer the content. For example, if the <www.CNN.com> site has a series of images maintained on the CNN target server, server side gateway 440 will pre-fetch the URIs from the CNN target server. If the <www.CNN.com> page also triggers pop-up advertisements which are maintained on a separate advertising server, server side gateway 440 may pre-fetch the pop-up advertisements from the advertising server. Thus, the appropriate server(s) are contacted for the various resources or objects needed. In one embodiment, the data received from the target server(s) is transferred back to client side gateway 430 using independent XTP connections, referred to as pre-fetch connection in FIG. 3B.

Client side gateway 430 listens on a designated, known port number for pre-fetch XTP connections back from server side gateway 440 for the delivery of pre-fetched resources. In one embodiment, for each pre-fetch XTP connection that arrives from server side gateway 440 containing a pre-fetched resource, client side gateway 430 reads the response header that has been prepended to the data. The match response information is placed in the pre-fetch database on or associated with client side gateway 430. A database entry generally exists for this pre-fetch connection because a pre-fetch announcement was sent over the forward fetch XTP connection as noted above. If the entry does not exist, then the entry is created. In one embodiment, the pre-fetch database comprises a storage medium in gateway 430. In another embodiment, the storage medium is maintained external to gateway 430.

In some circumstances, the pre-fetch XTP connection will arrive at client side gateway 430 prior to when the pre-fetch announcement is received from server side gateway 440. This may occur, for example, in the event there is data loss on the network and the pre-fetch announcement information must be retransmitted from server side gateway 440 to client side gateway 430.

If the client browser's TCP connection has been established and the response header matches the browser's request, then the XTP connection is logically connected with the client's TCP connection. Communications thereafter are similar to those described in International Publication No. WO 00/46669 A1, entitled "Internet Over Satellite." If the client browser's TCP connection has not arrived, client side gateway 430 initiates a timer and waits for it to arrive. If the client browser 410 does not request the pre-fetched information within a specified period of time (e.g., twenty (20) seconds), then client side gateway 430 disconnects the XTP connection and discards the pre-fetched HTTP data.

From the server side perspective, server side gateway 440 listens for forward fetch XTP connection requests on an appropriate port. Server side gateway 440 receives the XTP connection request from client side gateway 430, and completes the corresponding TCP connection to target web server 420. For example, if client 410 has requested the <www.CNN.com> web page, server side gateway 440 will complete the corresponding TCP connection to the CNN web server. The source IP address on this TCP connection is the address of the client browser system 410. In this manner, target server 420 is unaware that the client's connection request has been intercepted by the gateways 430, 440.

Server side gateway 440 collects the HTTP response from target web server 420. As known to those skilled in the art, the HTTP response includes a series of headers followed by the response body. In a particular embodiment, client side gateway 440 pre-fetches from the response body if the "Content-Type:" header contains "text/html". In alternative embodiments, other headers can trigger pre-fetching. In some embodiments, server side gateway 440 identifies other HTTP headers that may cause or prompt particular actions, such as for example, changing how the pre-fetch requests will be sent to the necessary target server(s), terminating pre-fetching, and the like.

Assuming a good HTTP response has been received from target server 420, and once the HTTP response headers have been read, server side gateway 440 then parses the HTTP response data containing HTML information for URI's to pre-fetch. In alternative embodiments, server side gateway 440 may parse other web encoding formats, including Extensible Markup Language (XML), and the like, within the scope of the present invention. Further, server side gateway 440 may designate a threshold or limit on the number of resources to be pre-fetched. A list of URIs is created, in addition to the request match information for each URI that will be sent back to client side gateway 430 as a pre-fetch announcement. In one embodiment, server side gateway 440 sends the announcements, if any, back to client side gateway 430 on the XTP connection, and subsequently, sends the original HTTP response data to client side gateway 430 on the XTP connection.

By sending the pre-fetch announcements to client side gateway 430 before the HTTP response data, this ensures that client browser 410 will not request any of the fetched items before client side gateway 430 is prepared. In this manner, client side gateway 430 can reliably react to new TCP connections from client browser 410. The pre-fetch announcements inform client side gateway 430 what URIs are in the process of being pre-fetched. If client browser 410 requests a page or URI that is not in the pre-fetch database, client side gateway 430 knows that the associated web item is not in the process of being pre-fetched and can initiate the forward fetch XTP connection to server side gateway 440 to make the HTTP request.

For each item to be pre-fetched, server side gateway 440 finds the appropriate server IP address through a domain name server (DNS) resolution. Server side gateway 440 initiates a separate TCP connection to the target server or servers, which again can be the CNN target server 420, advertising servers, proxy servers and/or other servers. Server side gateway 440 synthesizes the HTTP request(s), to the extent required, and sends the request(s) to target server or servers 420 over the TCP connection(s) to pre-fetch the URIs.

The synthesized request consists of a series of HTTP headers and a "GET" request for the particular URI to pre-fetch. For creating the synthesized request, in some embodiments HTTP header information is created as appropriate defaults (e.g., "Accept:" and "Connection:"). In other embodiments, HTTP headers may be cloned from the original client 410 HTTP request (e.g., "Proxy-Authorization:"), and/or created based on the original client 410 HTTP request and the URI (e.g., "URI:", "Host:" and "Referer:"). In some embodiments, the state information from the HTTP response received from target server 420, and the client 410 request is queried for information which may apply to the synthesized request to pre-fetch the URI. In this manner, limitations or characteristics imposed by "cookie(s)" may be incorporated into the URI pre-fetch GET request. It will be appreciated by those skilled in the art that the various HTTP headers and their associated standards may vary within the scope of the present invention.

As depicted in FIG. 3B, server side gateway 440 initiates an XTP connection back to client side gateway 430. A response header on this connection is sent before the pre-fetched HTTP data, for client side gateway 430 to use in matching the XTP connection to a client TCP connection requesting the pre-fetched resource. In one embodiment, this response header controls the matching process in client side gateway 430. Once the pre-fetched URI's have been forwarded to client side gateway 430, the XTP and TCP connections are logically connected at client side gateway 430, and the subsequent communications are similar to those described in International Publication No. WO 00/46669 A1, entitled "Internet Over Satellite."

In some embodiments, the initial HTTP request can be referred to as a "parent fetch." The information from the parent fetch request is used to determine the ability to pre-fetch, and synthetic content. In some cases, the pre-fetched object may identify additional URIs to pre-fetch. In this manner, pre-fetched content triggers additional pre-fetches. As a result, an XTP connection initiated by server side gateway 440 to client side gateway 430 may include a pre-fetch announcement (for the additional objects being pre-fetched) and a response match header (for the original object pre-fetched in response to the parent fetch). The additional pre-fetched objects may be transferred to client side gateway 430 using, if needed, one or more separate XTP connection(s). In a particular embodiment, a single XTP connection is used to transmit multiple pre-fetched objects and their corresponding response match headers. In another embodiment, a single response match header is used in conjunction with multiple response data packages, essentially piggy-backing pre-fetched objects onto an XTP connection to client side gateway 430.

More specifically, in one embodiment, server side gateway 440 reads the HTTP response data from each pre-fetch request to target server 420 and examines the data for additional URIs to be pre-fetched. The examination of the HTTP response data is the same as or similar to the process described above for harvesting URIs from the first HTTP request. If the server side gateway 440 finds additional URIs to pre-fetch, it sends pre-fetch announcement(s), including match request header(s), before the match response header, HTTP response header(s) and the HTTP response body on the pre-fetch XTP connection to client side gateway 430. Additional pre-fetch XTP connections may then be initiated from server side gateway 440 to client side gateway 430 as the additional URIs are pre-fetched.

Some websites have an extremely large number of resources capable of being pre-fetched. Thus, in some embodiments, it is desirable to pre-fetch content in a selected fashion to manage the rate at which pre-fetched objects consume resources within the system. Several load limiting mechanisms are used within the scope of the present invention. In one embodiment, client side gateway 430 inserts information into the request for HTTP data to inform server side gateway 440 of the amount of pre-fetch information client side gateway 430 is willing to receive. In one embodiment, server side gateway 440 is instructed as to the maximum amount of pre-fetch information client side gateway 430 is able to receive. This indication or "advertisement" of the capabilities of client side resources may occur with the initial HTTP GET request, or in subsequent communications including during the receipt of pre-fetched objects. In one embodiment, client side gateway 430 tracks a sum of advertised values or limits provided to server side gateway 440, and reconciles them against actual object announcements received indicating the web objects are being pre-fetched. In one embodiment, the number of pre-fetched announcements received at client side gateway 430 is monitored until the associated pre-fetched objects actually arrive at client side gateway 430. In this manner, an interim process occurs to keep client side gateway 430 from being overwhelmed by a large number of pre-fetched objects. The indication sent to server side gateway 440 may occur, for example, within one or more SkyX headers sent from client side gateway 430 to server side gateway 440.

In another embodiment, client side gateway 430 inserts into the SkyX header optional information telling server side gateway 440 the maximum rate at which it can receive, or wants to receive pre-fetched objects. This rate may be defined in connections per second, or some other parameter. In another embodiment, client side gateway 430 informs server side gateway 440 of the maximum reasonable delay for a pre-fetched object to arrive on client side gateway 430. In one embodiment, the reasonable delay and maximum rate parameters are centrally configured, while in an alternative embodiment each gateway provides a maximum rate and/or reasonable delay parameter to the opposing gateway. In one embodiment, using these two values, server side gateway 440 controls the pre-fetch connections back to client side gateway 430 to keep from overwhelming client side gateway 430.

In still another embodiment for limiting the amount of pre-fetched resources, a limit is placed on the size, and/or amount of data sent in the pre-fetch connection shown in FIG. 3B. In one embodiment, the specified amount of pre-fetched data is sent to client side gateway 430 prior to the client 410 requesting that particular web object. In this manner, a quantifiable limit is placed on the amount of data pre-fetched for a particular HTTP request. In another embodiment, the overall amount of information sent to client side gateway 430 in the pre-fetch connections is controlled by advertisements placed in SkyX headers on the forward fetch connections.

In some embodiments, target server 420 is a proxy server. In such a case, server side gateway 440 determines that target server 420 is a proxy server, such as by noting target server 420 has an IP address that matches pre-configured information indicating it is a proxy. Server side gateway 440 also may be aware target server 420 is a proxy server if a "Proxy-Connection:" header or a "Proxy-Authentication:" header(s) exists in the original HTTP request from client 410, or the like. It will be appreciated by those skilled in the art that alternative methods of recognizing target server 420 is a proxy server also fall within the scope of the present invention, and such determination is not limited to present header HTTP standards.

Once the proxy server nature of target server 420 has been identified, in one embodiment pre-fetch requests are sent back to the same proxy server. In this manner, server side gateway 440 does not need to perform or initiate DNS resolution on URIs that are to be pre-fetched. In a particular embodiment, for each item or resource to be pre-fetched, the "Proxy-Authentication:" header is cloned from the HTTP response originally received from the proxy server. In an alternative embodiment, pre-fetch GET requests are not all sent back to the same proxy server, but are instead routed to alternative servers which may also be other proxy servers.

By the methods as described above, the pre-fetching feature helps to eliminate one round trip time per web object or URI retrieved. Since in some cases about six hundred milliseconds (600 ms) round-trip time are used to retrieve each object over the long latency link, the time saved can be measurable when there are a large number of objects on a particular web page. Further, by ensuring the response header on the XTP connection matches the client browser request, the present invention ensures the appropriate data is transmitted to client browser 410. This may be particularly important in the event the web page has deposited "cookie(s)" on client browser 410. In this manner, the personalized nature of the cookie would be reflected in the retrieved HTTP response data.

In the event the browser's HTTP request and response header do not match, the data is not transmitted to the browser and the connection may proceed according to the TCP/XTP/TCP connection scheme as previously discussed and further described in International Publication No. WO 00/46669 A1, entitled "Internet Over Satellite," and the U.S. applications and patents previously incorporated herein by reference. By ensuring the content returned to the browser is not inconsistent with the cookie(s), methods of the present invention may be transparent to the browser. Further, the methods and systems of the present invention adopt a conservative approach in the pre-fetching functionality, to discard pre-fetched content when necessary to ensure accurate data transfer to client browser 410.

In one embodiment, a method of the present invention is incorporated into a computer implemented code for operation on client side gateway 430 and/or server side gateway 440. In a particular embodiment, the code is implemented in the kernel level code, rather than the application code, to facilitate scaling. It will be noted that, in one embodiment, client side gateway 430 and server side gateway 440 are identical or substantially identical in their functional capabilities. In other words, for one client 410 a gateway may operate as client side gateway 430, while for another client the same gateway operates as server side gateway 440. However, as will be noted, during a particular connection sequence between client 410 and target server 420, client side gateway 430 and server side gateway 440 for that connection perform different functions and roles.

Figure 4:
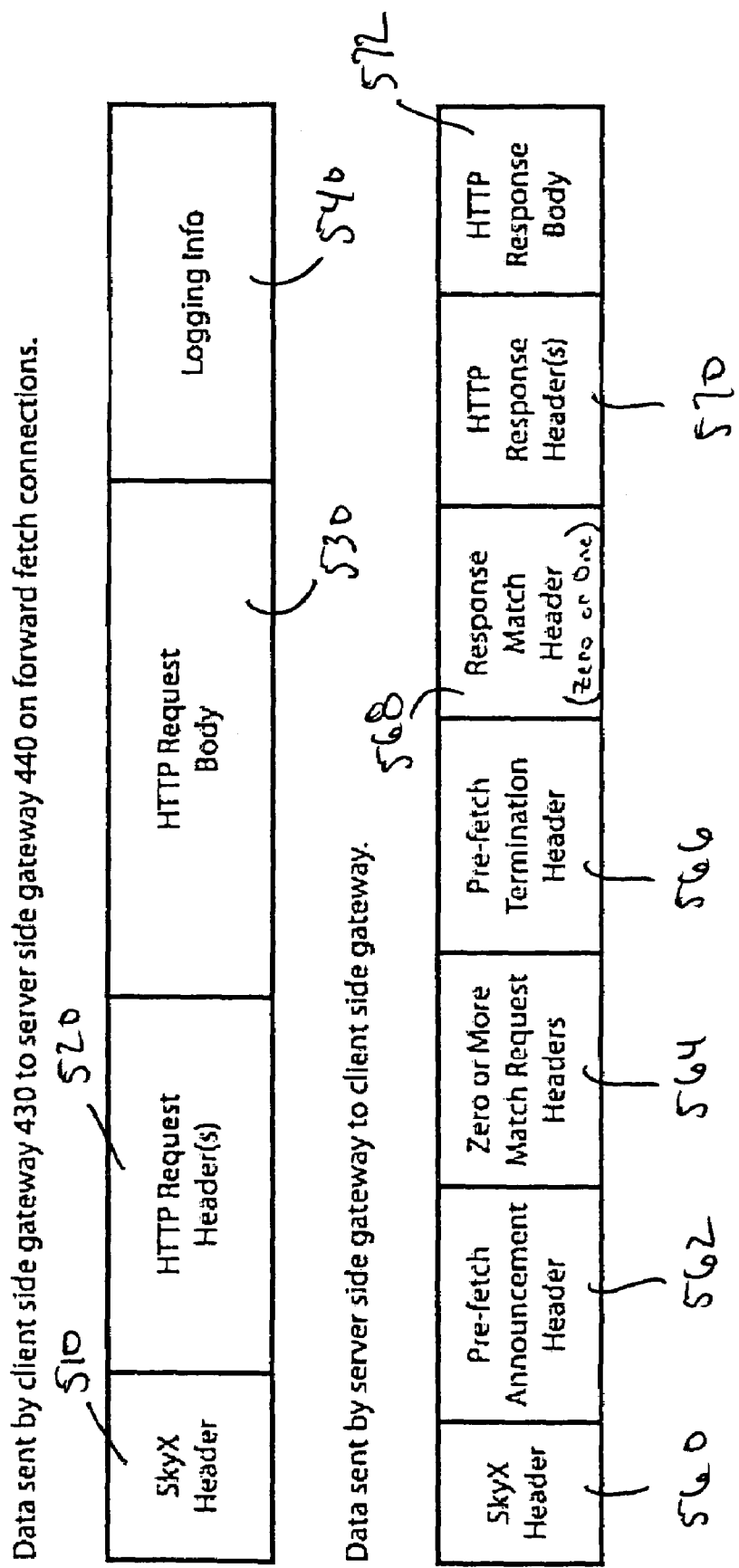
FIG. 4 is a simplified diagram of system architecture according to an embodiment of the present invention

The data flow on the XTP communication between client side gateway 430 and server side gateway 440 will now be described for one embodiment, with reference to FIG. 4. For data traversing from client side gateway 430 to server side gateway 440 on the forward fetch connection, the packeted data contains a program header 510, a request header 520, a request body (if any) 530, and logging information 540.

For the data flowing on the communication from server side gateway 440 to client side gateway 430, the data contains a program header 560, and a pre-fetch announcement header 562, which in one embodiment is added to the program header. The data packet may further include zero or more request match headers 564, a pre-fetch termination header 566, a response match header 568 (for pre-fetch connections), HTTP response header(s) 570, and the HTTP response body (if any) 572. The SkyX header is directed to the translation between TCP connections to XTP connections as further detailed in the applications, publications and patents incorporated herein by reference under "Cross-References to Related Applications." In one embodiment, SkyX header is an XTP header. In another embodiment, SkyX header includes an XTP header and an IP header.

In one embodiment, the design of the present invention localizes the amount of content related issues on server side gateway 440 of system 400. Client side gateway 430 logic is aware of the syntax of HTTP, and a comparatively small subset of matching primitives which are controlled by server side gateway 440 decision-making logic. In this manner, server side gateway 440 may be updated, if needed, without the need to update client side gateway 430. This will be particularly useful in the event client side gateway 430 resides on client 410, such as on a client computer hard drive or embedded in a commercial network appliance. Improvements and modifications to the system 400 can be implemented without impacting client 410, in some embodiments.

The HTTP request and response matching process will be further described. For each URI harvested and pre-fetched from the response body of the connection, a request match header is inserted into the data stream from server side gateway 440 to client side gateway 430 before the response body itself. This ordering helps ensure that client side gateway 430 is informed of the pre-fetched resource before client browser 410 will ask for it, because client browser 410 will not ask for this resource until it receives the response body. The request match header is identified by the URI being fetched, and the browser from which the corresponding request arrives. In addition, a secondary identifier is generated by server side gateway 440 to enable the corresponding pre-fetch connection to be matched with the pre-fetch announcement in the match list/database. These two identifiers allow the browser request from client browser 410, the request match header from server side gateway 440 on the parent fetch connection, and response match header from server side gateway 440 on the child pre-fetch connection, to be reconciled and, if good and sufficient, mated. The request match header contains a matching program generated by server side gateway 440 from the pre-fetch request it synthesized. Client side gateway 430 contains an interpreter which evaluates the matching program against the actual request header from browser 410. This matching ensures that the pre-fetched content is proper for the actual browser request. This is particularly important for HTTP requests which have associated cookie(s) residing on the browser. The request match header may also contain parameterization operation codes, used by server side gateway 440 to control parameters on client side gateway 430 in centrally-managed environments.

The match program contains operation codes for general HTTP header matching. The match can be established so as to require case sensitivity, prefix matching, suffix matching, quoted-string allowances, requirement for existence, requirement for non-existence, requirement for singularity, and the like. The general HTTP matching is insufficient for dealing with more complex cookie headers used in HTTP communications. Thus, in one embodiment of the present invention, an operation code exists for matching cookie headers and results against the set of cookies (if any) synthesized and delivered to server side gateway 440 with the pre-fetch request. The program interpreter properly matches the multiple versions of cookies as well as their various restrictive attributes, such as name, value, domain, path, and TCP port number.

In one embodiment, the client side gateway interpreter includes operation codes that parse HTTP request header syntax. The interpreter compares the parsed header information against a set of matching criteria. In one embodiment the matching criteria includes a matching program created and/or provided by server side gateway 440 to client side gateway 430. In another embodiment matching criteria is maintained in client side gateway 430. The interpreter, based on the outcome of these comparisons, takes an action specified by server side gateway 440. In one embodiment, the interpreter represents a functional extension of server side gateway 440 pre-fetch control logic that operates closer to the user (client browser 410) than is server side gateway 440.

The request match header may also contain operation codes which direct client side gateway 430 logic to respond to domain name service resolution (DNS) requests for the host name(s) in the harvested URI(s) which are being pre-fetched. The host address information necessary to respond to these requests is given. This can further reduce latency experienced by client browser 410 by allowing client side gateway 430 to respond to its DNS resolution requests rather than having those requests travel across a long latency link.

In one embodiment, during the process of harvesting prefetchable URI's from the parent object, and prior to being able to prefetch, some URI's will require translation of hostnames to IP addresses. This translation is performed by server-side gateway 440. In a particular embodiment, one or more of the resolved addresses are passed along with the prefetch header information to client side gateway 430. These same translations are likely to be needed by the source (e.g. web browser 410) prior to its generation of the HTTP request for the pre-fetched object, such as when the communications are being run in transparent fashion. In one embodiment, the hostname/IP address translations are stored in a memory in client side gateway 430. In a particular embodiment, the memory is a resolver cache, although other storage mediums also may be used within the scope of the present invention.

When client (e.g. web browser) 410 requests the hostname translation, the request is intercepted by gateway 430 and inspected. If the translation for the requested name is present in gateway 430, such as in the resolver cache, the translation is formulated into a response and delivered to client 410. In this manner, one or more transmissions between gateways 430, 440 over a long latency link are avoided, since the client 410 request for hostname translation does not need to be sent to server side gateway 440, nor does client side gateway 430 need to await a response to the translation request from server side gateway 440. In one embodiment, the response to the hostname translation request is constructed in a manner transparent to the source, 'spoofing' the target DNS server. If the requested hostname translation has not been "pre-fetched" and sent to client side gateway 430 resolver cache, the hostname translation request is passed along normally to server side gateway 440.

Complementary to the request match header, in one embodiment the response match header contains a secondary identifier which specifies the pre-fetch operation for which its content is to be conditionally delivered. As noted above, in one embodiment the response match header contains a matching program. Client side gateway 430 contains an interpreter which evaluates the matching program against the actual request header from browser 410. The response match program is generated on server side gateway 440 based on the response information from target web server(s) 420 for the pre-fetch request. Response matching determines if the pre-fetch response satisfies the request as is, must be rewritten, or if the pre-fetch content is not satisfactory and the request must be redone.

In one embodiment, the response match program contains operation codes for general HTTP header matching. In another embodiment, this feature is similar or identical to that of the request match operation code described above. The response match program can also contain operation codes which deal with content equivalence testing based on (1) last modification timestamps, and (2) uniqueness tags. Based on such tests, an appropriate response can be synthesized to satisfy a request for a redundant target resource. The response match program also enables the server side logic to command client side gateway 430 to (1) continue matching, (2) deliver the response unconditionally, (3) reinitiate the request through the pre-fetch mechanism, and/or (4) reinitiate the request bypassing the pre-fetch mechanism. The response match header may contain domain name service resolution (DNS) operation codes, as in the request match header.

EXAMPLE

An example of the match program header will be provided for a particular embodiment of the present invention. It will be appreciated by those skilled in the art that the match program header may vary compared to the listed example within the scope of the present invention.

In one embodiment, request headers are matched by request and response match programs. Each program consists of a header, a sequence of opcodes and operands (the code section), and a string/value pool. The program header gives the version of the instruction set, the sizes of the various portions, and the like. From the program header, the type (request or response), and identity (URI, server identification, and server serial number) can be determined. Scalar information within the match programs is represented in network order. The default goal of the match program is to have each top-level (i.e., not within an EVAL) operation result in MATCH. Some operations have an immediate effect, yielding a RESULT-CODE and, optionally, a replacement response header.

Within the program code section, the following opcode may be defined:
  cookie match (COOKIE)
  expression evaluation (EVAL, AND, OR, NOT)
  generic header match (GLHSRHS)
  hostname address list (HADR4, HADR6)
  no-op (NOOP)
  request information and address (REQ4, REQ6)
  response information and address (RSP4, RSP6)
  response equivalence and modification (RSPMATCH, RSPMOD)

Operands for the various opcodes are zero or more of:
scalar constant (unsigned, signed, IP address, IP address range, RESULT-CODE)
string constant
string pattern
sub-expression (one or more subordinate opcode(s))

Unsigned and signed scalar constants can be of one-, two-, or four-byte length. The IP address is either an IPv4 or IPv6 address. The IP address range is a CIDR address description. The string pattern can be either:
 a prefix match (e.g. "text/*")
 a suffix match (e.g. "*.gif")
 a regular expression (RE)

The RESULT-CODE is one of:
BYPASS—fail match and refetch bypassing prefetch processing
CONTINUE—continue match processing
DONE—match, deliver response or replacement
REFETCH—fail match and refetch via prefetch processing In one embodiment, the opcode specifics are as follows:

COOKIE:
operands:
 cookie version #
 left-hand-side string (e.g. 'Cookie:')
 name string
 value string
 (optional) domain string
 (optional) path string
 (optional) zero or more port number(s)
result
 MATCH or NOT-MATCH
special considerations:
 all COOKIE operations in a program must MATCH, otherwise the default overall result is REFETCH EVAL:
operands:
 RESULT-CODE
 sub-expression
 (optional) replacement response string
result:
 MATCH, NOT-MATCH, or RESULT-CODE (with replacement)

AND, OR:
operands:
 left sub-expression
 right sub-expression
result:
 MATCH or NOT-MATCH NOT:
operand:
 sub-expression
result:
 MATCH or NOT-MATCH GLHSRHS:
operands:
 left-hand-side string constant
 right-hand-side match options:
  CASE/NO-CASE |FULL/PREFIX/RE/SUFFIX|
  QUOTED-STR |SUB-TOKEN| REQUIRED|
  DENIED| ONE-ONLY
 (optional) right-hand-side string constant/pattern
 (optional) sub-token allowance string constant
 (optional) RESULT-CODE
 (optional) replacement response string
result:
 MATCH, NOT-MATCH, or RESULT-CODE (with replacement)
special considerations:
 CASE/NO-CASE determines if case-sensitive string matching is to be used on the RHS (if any)
 FULL/PREFIX/RE/SUFFIX determines if a full string, prefix string, regular-expression, or suffix string match is to be used on the RHS (if any)
 QUOTED-STR determines if the RHS value may be quoted (")
 SUB-TOKEN determines how the RHS value should be tokenized, and the match performed on those sub-tokens
 REQUIRED indicates that this operation MUST MATCH a request header value; otherwise, not required
 DENIED indicates that this operation MUST NOT-MATCH a request header value; otherwise, allowed
 ONE-ONLY indicates that multiple instances of matching request headers causes a FAIL HADR4, HADR6:
operands:
 proxy flag
 zero or more IPv4 or IPv6 address(es)
result:
 MATCH
special considerations
 address(es) given are for the hostname in the URI associated with the request NOOP:
operand:
 (nothing)
result:
 MATCH REQ4, REQ6:
operands:
 REQ-GET
 (HTTP) request version # (e.g. HTTP/1.0)
 request port #
 request hostname string constant
 request path string constant
 client (browser) IPv4 or IPv6
 prefetch server IPv4 or IPv6
result:
 MATCH
special considerations
 existence of this opcode indicates a request match header
 one of REQ4, REQ6, RSP4, RSP6 can exist in any program (these are distinguished opcodes)

RSP4, RSP6:
operands:
 RESULT-CODE
 prefetch server IPv4 or IPv6
 (optional) replacement response string
result:
 RESULT-CODE (with replacement)
special considerations:
 for RESULT-CODE of CONTINUE, the response match program is executed, otherwise the result is immediate
 existence of this opcode indicates a request match header one of REQ4, REQ6, RSP4, RSP6 can exist in any program (these are distinguished opcodes)

RSPMATCH, RSPMOD:
operands:
　left-hand-side string constant
　right-hand-side string constant
　(optional) replacement response string
result:
　CONTINUE or DONE (with replacement)
special considerations:
　performs special matching of ETag/Modification Time values, to deliver the (newer) pre-fetched result or to indicate equality; if no 'custom' replacement response is present, a 'stock' response is delivered for equality Notwithstanding the above description, it should be recognized that many other systems, functions, methods, and combinations thereof are possible in accordance with the present invention. For example, while the above discussion identifies an XTP connection between gateways 430 and 440, alternative connections may be used including modified XTP, modified TCP, SCPS, or the like. Further, while the above discussion is focused primarily on present HTTP standards and browser operation, the standards and operations may change or evolve within the scope of the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method of communicating over a communications link, the method comprising:
　receiving, from a first gateway, a request for a base web object, wherein the base web object identifies one or more referenced web objects therein;
　retrieving the base web object;
　parsing the base web object to identify one or more referenced web objects to be pre-fetched;
　constructing, and transmitting to the first gateway, a pre-fetch announcement identifying the one or more referenced web objects to be pre-fetched wherein the pre-fetch announcement comprises, for each referenced web object to be pre-fetched, a matching program comprising a data locator for the referenced web object and one or more operation codes operative to how requests for a given reference web object are to be matched to the referenced web objects to be pre-fetched; and
　subsequent to constructing and transmitting the pre-fetch announcement, transmitting the base web object to the first gateway.

2. A method comprising:
　receiving, from a first gateway, a request for a base web object;
　retrieving the base web object;
　parsing the base web object to identify one or more referenced web objects to be pre-fetched;
　for each referenced web object to be pre-fetched, constructing a matching program comprising a data locator for the referenced web object, one or more operation codes and, one or more operands;
　sending, to the first gateway, a pre-fetch announcement and subsequently the base web object, wherein the pre-fetch announcement includes the matching programs for at least one of the one or more referenced web objects to be pre-fetched;
　pre-fetching the one or more referenced web objects; and
　sending the one or more pre-fetched web objects to the first gateway, wherein the first gateway is operative to receive client requests for the one or more referenced web objects;
　match the client requests to the pre-fetched referenced web objects by applying the corresponding matching programs associated with the pre-fetched referenced web objects against request headers of the client requests and executing the one or more operation codes in the respective matching programs.

3. The method as in claim 2 further comprising receiving a pre-fetch limit indicator from the first gateway, and wherein the number of pre-fetched referenced web objects is limited by the pre-fetch limit indicator.

4. The method as in claim 3 wherein the pre-fetch limit indicator comprises a limit on a pre-fetch connection data amount.

5. The method as in claim 3 further comprising receiving an updated pre-fetch limit indicator.

6. The system in claim 2 wherein the operation codes include an operation code for a cookie match operation.

7. A system for communicating over a communications link, the system comprising:
　a first gateway adapted to communicate with a client, the first gateway comprising a processor coupled to a storage medium, the storage medium comprising:
　code for receiving a request for a base web object, wherein the base web object identifies one or more referenced web objects therein;
　code for forwarding the request to a second gateway over the link;
　code for receiving, at the first gateway from the second gateway, a pre-fetch announcement identifying at least one of the one or more referenced web objects and the base web object, wherein the base web object is transmitted from the second gateway subsequent to the pre-fetch announcement, and wherein the pre-fetch announcement comprises, for each referenced web object to be pre-fetched, constructing a matching program comprising a data locator for the referenced web object, one or more operation codes and, one or more operands;
　code for receiving, at the first gateway from the second gateway, the one or more referenced web objects;
　code for receiving client requests for the one or more referenced web objects; and
　code for matching the client requests to the pre-fetched referenced web objects by applying the corresponding matching programs associated with the pre-fetched referenced web objects against request headers of the client requests and executing the one or more operation codes in the respective matching programs.

8. The system as in claim 7 wherein the storage medium comprises a resolver cache.

9. The system as in claim 7 further comprising a second gateway adapted to communicate with a server, the second gateway comprising a processor coupled to a storage medium, the storage medium comprising:
　code for receiving the request for retrieving the base web object;
　code for retrieving the web object and parsing the base web object for one or more referenced web objects to pre-fetch;
　code for creating and forwarding the pre-fetch announcement to the first gateway; and code for retrieving the one or more referenced web objects from a target server.

10. The system as in claim 9 wherein the pre-fetch announcement comprises one or more response matching programs facilitating matching of the referenced web objects to the matching programs.

11. The system in claim 7 wherein the operation codes include an operation code for a cookie match operation.

12. A method comprising:
   receiving, at a first gateway, a client request for a base web object, wherein the base web object identifies a referenced web object therein;
   forwarding the client request to a second gateway;
   receiving, from the second gateway, a pre-fetch announcement for the referenced web object including a request match header, wherein the request match header comprises a matching program, wherein the matching program comprises a data locator for the referenced web object, one or more operation codes and one or more operands;
   receiving the referenced web object from the second gateway;
   receiving a second client request for the referenced web object, wherein the second client request includes a request header including second data locator; and
   matching the second client request to the referenced web object by applying the matching program against the request header of the second client request and executing the one or more operation codes in the matching program.

13. The method in claim 12 wherein the operation codes include an operation code for a cookie match operation.

* * * * *